(12) United States Patent
Koren et al.

(10) Patent No.: US 10,595,028 B2
(45) Date of Patent: Mar. 17, 2020

(54) ENCODING/TRANSCODING BASED ON SUBJECTIVE VIDEO QUALITY PREFERENCES

(71) Applicant: Harmonic, Inc., San Jose, CA (US)

(72) Inventors: Noam Koren, Los Gatos, CA (US); Jeremy Cole Rosenberg, Huntingdon Valley, PA (US); Marcelo C. San Martin, Alviso, CA (US)

(73) Assignee: Harmonic, Inc., San Jose, CA (US)

( * ) Notice: Subject to any disclaimer, the term of this patent is extended or adjusted under 35 U.S.C. 154(b) by 469 days.

(21) Appl. No.: 15/049,051

(22) Filed: Feb. 20, 2016

(65) Prior Publication Data

US 2016/0316216 A1    Oct. 27, 2016

Related U.S. Application Data

(60) Provisional application No. 62/118,690, filed on Feb. 20, 2015, provisional application No. 62/118,689, filed on Feb. 20, 2015.

(51) Int. Cl.
*H04N 7/12* (2006.01)
*H04N 19/40* (2014.01)
(Continued)

(52) U.S. Cl.
CPC .......... *H04N 19/40* (2014.11); *H04L 67/306* (2013.01); *H04N 19/115* (2014.11);
(Continued)

(58) Field of Classification Search
CPC .. H04N 19/593; H04N 19/172; H04N 19/147; H04N 21/2662; H04N 21/64322;
(Continued)

(56) References Cited

U.S. PATENT DOCUMENTS

2011/0307900 A1    12/2011    Fatehpuria et al.
2012/0019726 A1*    1/2012    Arora ............... H04N 21/42202
                                                    348/602
(Continued)

FOREIGN PATENT DOCUMENTS

EP    1233622 A2    8/2002
EP    1233622 A3    8/2002
(Continued)

OTHER PUBLICATIONS

European Patent Office, Written Opinion Of The International Preliminary Examining Authority dated Jan. 23, 2017 for International Application No. PCT/US2016/018825, International Filing Date Feb. 20, 2016, 13 pages.
(Continued)

*Primary Examiner* — Masum Billah
(74) *Attorney, Agent, or Firm* — Brokaw Patent Law PC; Christopher J. Brokaw

(57) ABSTRACT

Approaches for encoding/transcoding of digital video based on subjective video quality preferences or display device characteristics or capabilities. A set of esthetic digital video preferences are received from a user via a user interface. The user may be associated with a supplier or provider of digital video or may be a viewer of the digital video. A video quality profile that describes the set of esthetic digital video preferences or the characteristics or capabilities of a display device is created and stored. Upon determining that a video quality profile is associated with a compressed digital video bit stream, a final rate of compression for the compressed digital video bit stream is determined using one or more video quality profiles. In this way, a user's subjective video quality preferences or the characteristics or capabilities of a display device can be considered in encoding/transcoding digital video.

20 Claims, 6 Drawing Sheets

(51) Int. Cl.
| | |
|---|---|
| *H04N 21/2343* | (2011.01) |
| *H04N 19/162* | (2014.01) |
| *H04N 19/154* | (2014.01) |
| *H04N 21/2662* | (2011.01) |
| *H04N 21/658* | (2011.01) |
| *H04N 21/258* | (2011.01) |
| *H04N 19/115* | (2014.01) |
| *H04N 19/147* | (2014.01) |
| *H04N 19/172* | (2014.01) |
| *H04N 19/593* | (2014.01) |
| *H04N 19/184* | (2014.01) |
| *H04N 19/46* | (2014.01) |
| *H04L 29/08* | (2006.01) |

(52) U.S. Cl.
CPC ......... *H04N 19/147* (2014.11); *H04N 19/154* (2014.11); *H04N 19/162* (2014.11); *H04N 19/172* (2014.11); *H04N 19/184* (2014.11); *H04N 19/46* (2014.11); *H04N 19/593* (2014.11); *H04N 21/2343* (2013.01); *H04N 21/25891* (2013.01); *H04N 21/2662* (2013.01); *H04N 21/6582* (2013.01)

(58) Field of Classification Search
CPC ......... H04N 21/23439; H04N 21/2343; H04N 21/2402; H04N 21/6377; H04N 7/17318
USPC ...................................... 375/240.2
See application file for complete search history.

(56) References Cited

U.S. PATENT DOCUMENTS

| | | | |
|---|---|---|---|
| 2013/0297743 A1 | 11/2013 | Eschet et al. | |
| 2013/0343450 A1* | 12/2013 | Solka ................ | H04N 19/40 375/240.03 |
| 2014/0317532 A1* | 10/2014 | Ma .................... | H04N 7/152 715/753 |

FOREIGN PATENT DOCUMENTS

| | | |
|---|---|---|
| WO | WO02035844 A2 | 5/2002 |
| WO | WO02035844 A3 | 5/2002 |
| WO | WO2005003899 A2 | 1/2005 |
| WO | WO2005003899 A3 | 1/2005 |
| WO | 2012/145249 A1 | 10/2012 |
| WO | 2016134343 A1 | 8/2016 |

OTHER PUBLICATIONS

Kalman et al., "Rate-distortion optimized video streaming with multiple deadlines", Proceedings 2003 International Conference on Image Processing (CAT.No. 03CH37429), Barcelona, Spain, Sep. 14, 2003, pp. 661-664, volume 3, XP010670004, ISBN: 978-0-7803-7750-9, IEEE Piscataway, NJ, USA.

European Patent Office, Invitation to Pay Additional Fees and, Where Applicable, Protest Fee for International Application No. PCT/US2016/018825, International Filing Date Feb. 20, 2016, 8 pages.

European Patent Office, "Notification of Transmittal of the International Search Report and the Written Opinion of the International Searching Authority, of the Declaration" for International Application No. PCT/US2016/018825, International Filing Date Feb. 20, 2016, 19 pages.

European Patent Office, International Preliminary Report on Patentability dated May 31, 2017 for International Application No. PCT/US2016/018825, International Filing Date Feb. 20, 2016, 13 pages.

Applicant's Response to Written Opinion dated Aug. 8, 2016, dated Dec. 19, 2016, filed in International Application No. PCT/US2016/018825, 6 pages.

Applicant's Response to the IPEA dated Jan. 23, 2017, filed in International Application No. PCT/US2016/018825, 6 pages, 8 pages.

Substitute sheet of claims of International Application No. PCT/US2016/018825, filed on Jan. 23, 2017, 6 pages.

* cited by examiner

ENCODING/TRANSCODING BASED ON SUBJECTIVE VIDEO QUALITY PREFERENCES

CLAIM OF PRIORITY

This application claims priority to U.S. provisional patent application No. 62/118,689, filed Feb. 20, 2015, entitled "Encoding/Transcoding Based on Desired Subjective Video Quality Preferences," the contents of which are hereby incorporated by reference for all purposes as if fully set forth herein.

This application claims priority to U.S. provisional patent application No. 62/118,690, filed Feb. 20, 2015, entitled "Transcoding-On-The-Fly (TOTF)," the contents of which are hereby incorporated by reference for all purposes as if fully set forth herein.

FIELD OF THE INVENTION

Embodiments of the invention generally relate to encoding/transcoding of digital video based on subjective video quality preferences.

BACKGROUND

Regardless of how digital video is transmitted (be it over a wired network link, a wireless network link, satellite distribution, or terrestrial distribution), using bandwidth efficiently is of critical importance. Over the past decades, many billions of dollars have been spent attempting to discover more efficient ways to transmit digital video. In the digital video domain, a great deal of this focus has been on maximizing the bit efficiency for a target video quality using a particular video codec.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
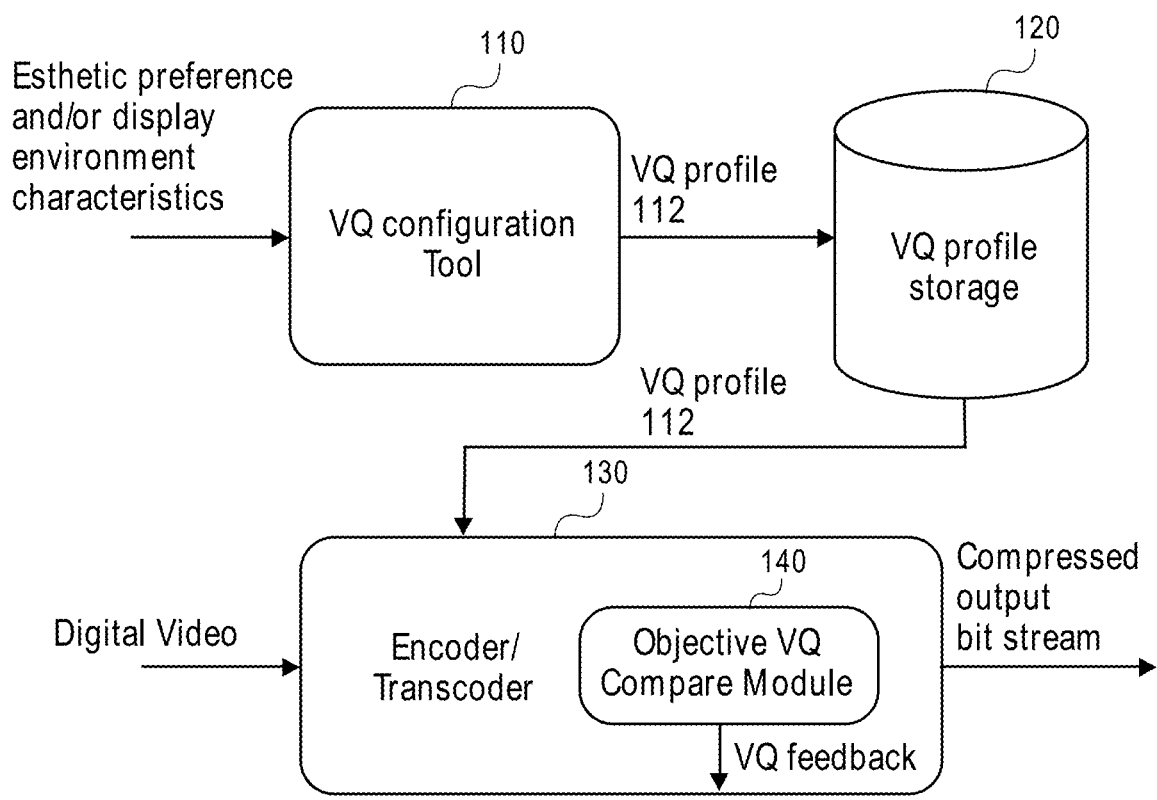
FIG. 1 is a block diagram of a system according to an embodiment of the invention.

Approaches for performing encoding/transcoding of digital video based on subjective video quality preferences are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

New Encoding Paradigm

Previously, digital video was encoded using automated processes to optimize the video quality of the encoded digital video based on the available bandwidth. According to known approaches, algorithmic measures of video complexity may be employed to determine how the digital video should be encoded or transcoded. Such algorithmic measures generally involve statistical data that describe characteristics of the digital video, such as spatial activity and motion. These algorithmic measures have been used by prior approaches to estimate how many bits are necessary to express the digital video at a target video quality. These algorithmic measures have been widely used in the encoding/transcoding process to achieve a target video quality rather than measuring the actual video quality achieved on an automated basis, and thereafter, adjusting the compression level of the digital video to the target video quality.

Embodiments of the invention provide for an automated subjective video quality (VQ) encoding/transcoding system which can provide feedback into the video encoding/transcoding process in a manner that can yield bit efficiency for a given video quality without becoming unduly burdened by the requisite processing. A subjective video quality configuration tool of an embodiment exposes an interface that allows a user to configure and store their esthetic video preferences. Information about a user's atheistic video preferences are stored in a video quality profile or ("VQ profile"). This VQ profile may be used in an iterative fashion during the encoding/transcoding process to maximize bit efficiency at a target video quality.

When digital video is encoded or transcoded, the resulting digital video is compressed. Previously, the rate of compression of digital video is largely influenced by the output bit rate as defined by the user. In contrast, according to embodiments of the invention, the rate of compression during encoding or transcoding is determined in an iterative process that considers subjective user preference's or information about the environment in which the digital video will ultimately be displayed, such as the physical size of the screen or capabilities of the display device upon which the digital video will be viewed. This process results in an improved management of the output bit rate over prior approaches.

For example, prior approach may needlessly spend bits describing aspects of the digital video to satisfy a certain target video quality; however, the screen of the display device upon which the digital video is viewed may be of a size which cannot utilize all the information conveyed by the compressed digital video, resulting in wasted bits. Advantageously, embodiments of the invention are capable of considering not only the capabilities of the display device, but also the personal esthetic preferences of the viewer in determining how to encode/transcode digital video.

According to an embodiment, encoding/transcoding is performed by measuring the actual video quality achieved on an automated basis, and thereafter, using a feedback loop to adjust the compression level of the digital video based on a target video quality which considers factors such as a user's personal esthetic preferences and the capabilities of the display device. The bit efficiency achievable by embodiments is valuable in any type of environment that is bit constrained, such as a storage environment or a transmission environment.

Moreover, embodiments allow for providers of digital video to encode or transcode digital video in accordance with artistic vision or esthetic preference in a variety of different ways. To illustrate but one example, embodiments of the invention enable a provider of digital video to specify the importance and handling of the retention of details and contrast with luminance and contrast during the encoding/transcoding process to achieve certain visual effects.

Subjective Video Quality Preferences

An automated subjective video quality (VQ) encoding/transcoding system of an embodiment can be tuned based on a variety of user-specified esthetic criteria. For example, a user that operates an automated subjective video quality (VQ) encoding/transcoding system of an embodiment may cause digital video to be encoded or transcoded according to various subjective video quality characteristics, such as, but not limited to: (1) contrast, (2) watching distance (i.e., how far away does the viewer prefer to sit from the screen), (3) the resolution of the digital video (4) darkness, (5) brightness (or luminance), and (6) motion.

Video quality is a subjective matter, as different people may prefer digital video to be displayed differently using a different set of visual parameters. Other examples of visual parameters which different people may wish to customize include the the amount of details, the sensitivity to brightness (i.e., how important is the retention of details and contrast with brighter video during the encoding/transcoding process), and the sensitivity to black and white levels (i.e., how important is the retention of details and contrast with very white and very black video during the encoding/transcoding process).

The creation and use of a user specific VQ profile allows the user to control the esthetic priority of different visual parameters in the calculation of video quality measured by the encoder/transcoder. Also, as shall be explained in greater detail below, a VQ profile may be used to control the esthetic priority of different visual parameters in the calculation of video quality measured by the encoder/transcoder based on not only user defined esthetic criteria, but also information about the display device or environment on which the digital video will ultimately be viewed. Non-limiting, illustrative examples of such considerations include whether the display device supports certain features, such as 3-D display, and the screen size of the display device.

Different parties or users may express different esthetic preferences with respect to different subjective video quality characteristics. Embodiments comprise a video quality (VQ) configuration tool which exposes an interface that allows such esthetic preferences of a party or user to be recorded in a VQ profile. This VQ profile is used in the encoding or transcoding process to ensure that the digital video is encoded or transcoded using the least amount of bits to achieve the desired subjective video quality preferences.

Embodiments of the invention operate under the recognition that subjective video quality yields higher quality digital video using the fewer amount of bits than the use of algorithmic complexity (which, after all, is just a proxy for video quality). Extensive testing of the automated subjective video quality (VQ) encoding/transcoding system of an embodiment has demonstrated that subjective video quality preferences exhibit a strong conformance to certain measured parameters. In other words, by identifying a user's subjective video quality preferences, it is possible to identify how digital video should be modified to reflect those subjective video quality preferences. As a result, the encoder of an embodiment makes better use of data bits by ensuring that data bits in the compressed bitstream describe the content that matters the most to the person who provided the subjective video quality preferences. By tuning how video quality in the digital video is measured to better reflect our human sensibilities and physiology, the encoder is able to assign data bits to the description of the content that matters most in the digital video.

In certain embodiments, the person who provides the subjective video quality preferences may be associated with the provider or supplier of the digital video, while in other embodiments the person who provides the subjective video quality preferences may be the viewer of the digital video.

By collecting and employing subjective video quality preferences to obtain encoding or transcoding parameters used during the encoding or transcoding process, significant bit efficiency improvements may be achieved, as bits are used to describe what is important to the provider of the subject video quality preferences, and details in the digital video which are not important are not described by bits by the encoder. Video quality measurements may be used by the encoder/transcoder during the encoding/transcoding process to achieve better video compression. The benefit of doing is that if the measured video quality of the encoded/transcoded digital video processed by the encoder/transcoder is higher than a target video quality, then the digital video may be re-encoded at a lower bit rate to achieve the target video quality. On the other hand, if the measured video quality of the encoded/transcoded digital video processed by the encoder/transcoder is lower than the target video quality, then the digital video may be re-encoded using a higher bit rate to achieve the target video quality. As subjective automated video quality adjustments better match the target human experience than traditional algorithmic approaches, significant bit rate savings may be achieved on average even if not for every frame.

Embodiments enable a digital video to be encoded at a particular video quality level using fewer bits than prior approaches; consequently, in a constant bit rate environment, the average video quality can be improved by savings bits whenever the video quality is satisfactory and using the saved bits when the constant bit rate (CBR) rate permits the desired video quality to be achieved. As another example, in a stat-mux environment, more channels may advantageously be included into an existing bit allocation for the same video quality.

Embodiments may also be advantageously used to mix different levels of video quality within a stat-mux, which is not possible in the prior art. At best, in the prior art, different minimum bit allocation thresholds may be set across channels. In contrast, using embodiments of the invention, bit utilization may be advantageously aligned to the creative concern of content distributors who can determine how to best allocate bits between the different video quality aspect so as to place more or less emphasis on any given aspect (such as contrast or motion). This feature enables the user to more directly tune individual and multiplexed encoding processes to their priorities and preferences. A user's recorded preferences about certain esthetic factors of digital video can be used quite advantageously to produce multi-format encoding/transcoding where the parametric trade-offs are adjusted by format as a proxy for the type of environment/device type ultimately receiving and displaying the digital video, which allows multi-format optimizations never before possible.

In the prior art, compressed video was generally assumed to be displayed on a television set. However, it is now common for digital video to be displayed on computers, tablets, mobile phones, and other mobile devices in addition to a variety of television sets and screens of various dimensions and sophistications. These digital video displays have vastly different capabilities with respect to displaying digital video. Advantageously, according to another embodiment, the encoding/transcoding process may modify how video quality is measured based upon characteristics of the environment or display ultimately displaying the digital video. By creating a VQ profile that takes into account the capabilities and characteristics of the display device, a different or customized encoding/transcoding scheme may be used for each individual display device or for a set of display devices having a similar set of capabilities and characteristics.

In a transcoding on-the-fly (TOTF) environment, the display device receiving a digital video transmission may indicate its device type, or other environment specific information, to the encoder/transcoder. Having the benefit of this information, the encoder/transcoder may adjust the encoding/transcoding process to optimize the display of the digital video for the receiving display device. For example, if the encoder/transcoder is aware that the display device is of a certain dimension or is poorly equipped to display luminance or other visual parameters with sophistication or nuance, then the encoder/transcoder can weigh these factors in deciding how to allocate bits to various characteristics of the digital video to achieve a target video quality.

According to another embodiment, a plurality of VQ profiles that are each associated with a different constant bit rate may be employed in an adaptive bit rate (ABR) video delivery environment. By measuring the video quality, it is possible to identify the highest resolution and frame rate that provides the target video quality for a given bitrate using the VQ profile associated with the current bit rate. The resolution and frame rate can be adjusted based on the highest resolution and frame rate specified by the VQ profile associated with the current bit rate. As a result, the user experience is improved due to the increase in average resolution and/or frame rate.

System Architecture

FIG. 1 is a block diagram of automated subjective video quality (VQ) encoding/transcoding system 100, also referred to as system 100, according to an embodiment of the invention. In the embodiment depicted in FIG. 1, system 100 includes video quality configuration tool 110, VQ profile storage 120, encoder/transcoder 130, and objective VQ compare module 140.

Figure 3:
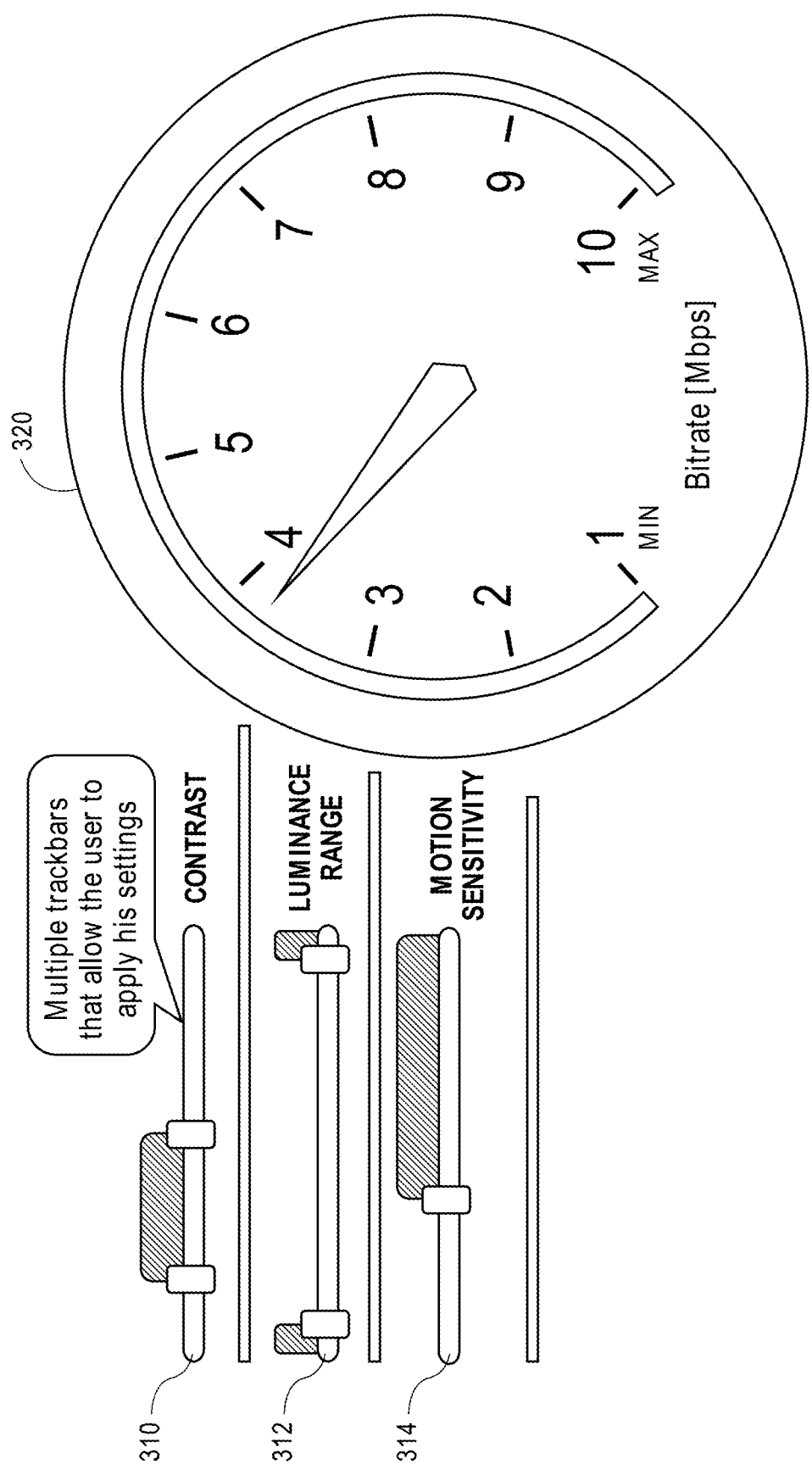
FIG. 3 is an illustration of a first user interface through which a user may specify subjective video quality preferences used in encoding digital video according to an embodiment of the invention.
Figure 4:
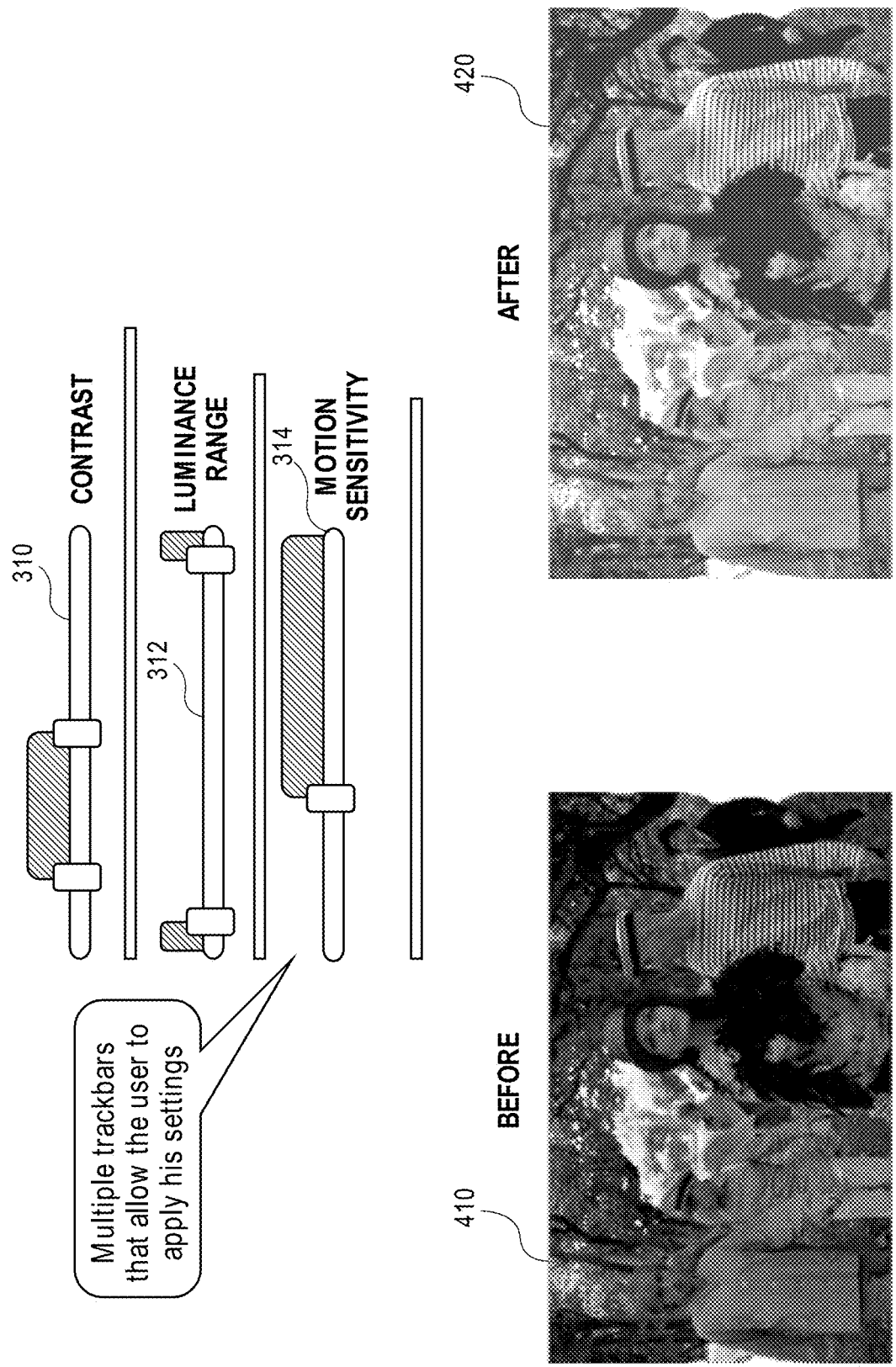
FIG. 4 is an illustration of a second user interface through which a user may specify subjective video quality preferences used in encoding digital video according to an embodiment of the invention.

Video quality (VQ) configuration tool 110, as broadly used herein, refers to software designed to collect information used in the creation of a VQ profile. VQ configuration tool 110 may expose an interface that enables a user to describe their esthetic video preferences or characteristics/capabilities of one or more display devices or display environments. FIGS. 3 and 4 depict illustrative user interfaces exposed and supported by VQ configuration tool 110.

VQ profile storage 120, as broadly used herein, represents any repository or storage mechanism for storing one or more VQ profiles. As used herein, a VQ profile is a set of data, associated with a particular user or party, which describes a set of esthetic preferences or characteristics of a display device or display environment. One or more VQ profiles are used by system 100 in an iterative fashion during the encoding/transcoding process to maximize bit efficiency in consideration of a user's esthetic preferences or display device capabilities.

Encoder/transcoder 130, as broadly used herein, refers to any software component capable of performing digital video encoding or digital video transcoding. Encoders and transcoders are well-known to those in the art; embodiments of the invention may employ a wide-variety of encoders or transcoders as encoder/transcoder 130.

Objective video quality (VQ) compare module 140, as broadly used herein, refers to software designed to compare compressed bit streams produced by encoder/transcoder 130 against the characteristics described by a VQ profile. If certain criteria specified in the VQ profile are not satisfied by a compressed bit stream, then objective video quality compare module 140 is designed to provide VQ feedback data, which describes any discrepancies there between, to encoder/transcoder 130.

Figure 2:
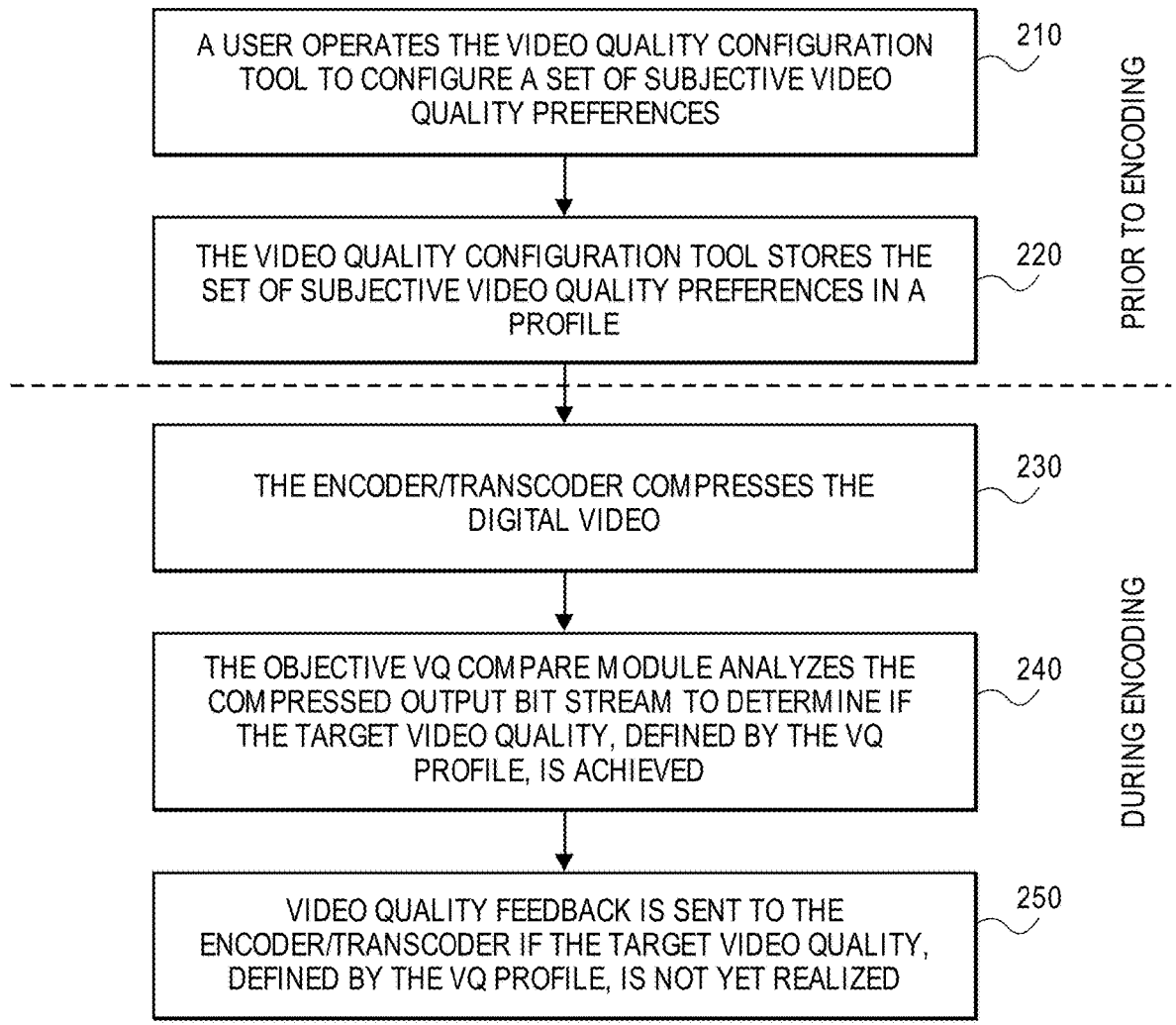
FIG. 2 is a flow chart of encoding digital video using subjective video quality preferences according to an embodiment of the invention.

The components of system 100 depicted in FIG. 1 shall be referenced below in the description of FIG. 2, which is a flowchart illustrating the steps of encoding/transcoding digital video using subjective video quality preferences according to an embodiment of the invention. Note that steps 210 and 220 of FIG. 2 are performed prior to the encoding/transcoding of digital video, while steps 230-250 of FIG. 2 are performing during or contemporaneous with the encoding/transcoding process.

In step 210, a user operates VQ configuration tool 110 to configure a set of subjective video quality settings and/or display device capabilities. The information configured by the user will be used in the creation of a VQ profile.

VQ configuration tool 110 may expose an interface that enables a user to describe their esthetic video preferences or characteristics/capabilities of one or more display devices or display environments. The interface exposed by video quality configuration tool 110 may comprise a set of user interface controls (such as buttons, sliders, trackbars, and the like) which allow the user to tune digital video according to their preference and/or the capabilities of a particular environment in which digital video will be viewed.

For purposes of providing a concrete example, FIGS. 3 and 4 are illustrations of a user interface exposed by VQ configuration tool 110 according to an embodiment of the invention. As shown in FIG. 3, a user may configure slider 310 to indicate his or her preference towards contrast in digital video, a user may configure slider 312 to indicate his or her preference towards luminance in digital video, and a user may configure slider 314 to indicate his or her preference towards motion sensitivity in digital video. While only three user interface controls for specify esthetic preferences are shown in FIG. 3, those in the art shall appreciate that any number and type of user interface controls may be employed by embodiments. As can be appreciated, one could affect the encoding/transcoding of digital video to achieve artistic or particular esthetic effects using embodiments.

Advantageously, the user interface exposed by VQ configuration tool 110 can provide information to the user in real-time regarding the impact their configurations will have upon encoded/transcoded digital video. For example, the user interface exposed by VQ configuration tool 110 shown in FIG. 3 may display in real-time the impact the user's configurations have to encoded/transcoded digital video with respect to the average bit rate using the display of dial 320. As another example, the user interface exposed by VQ configuration tool 110 shown in FIG. 4 may display in real-time the impact the user's configurations have to encoded/transcoded digital video with respect to the appearance of the digital video by showing the digital video prior to the user's configurations in display area 410 and showing the affect the user's configurations have upon the digital video in display area 420.

After a user has finished configuring his or her esthetic preferences and/or display environment capabilities, then the user submits his or her configurations to VQ configuration tool 110 and step 220 is initiated.

In step 220, VQ configuration tool 110 creates the VQ profile which the user configured in step 210. For purposes of providing a concrete example, the VQ profile created in step 220 is depicted in FIG. 1 as VQ profile 112. After VQ configuration tool 110 creates a VQ profile in step 220, VQ configuration tool 110 stores the newly created VQ profile in VQ profile storage 120.

Note that steps 210 and 220 may be performed repeatedly any number of times. As a result, any number of VQ profiles may be stored in VQ profile storage 120.

At some point in time after one or more VQ profiles are stored in VQ profile storage, encoder/transcoder receives an instruction to initiate encoding or transcoding of digital video. At this point, processing proceeds to step 230.

In step 230, encoder/transcoder 130 encodes or transcodes the requested digital video, and in the act of doing so, compresses the video source to produce a compressed output bit stream.

In step 240, objective VQ compare module 140 analyzes the compressed output bit stream produced by encoder/transcoder 130 to determine if the compressed output bit stream satisfies a VQ profile associated with the compressed output bit stream. In an embodiment, a VQ profile is associated with the compressed output bit stream if the VQ profile was created by a user either initiating the encoding/transcoding of the digital video or initiating the transmission of the compressed output bit stream. Other criteria or approaches may be used by embodiments to determine whether a VQ profile is associated with a compressed output bit stream. The purpose of step 240 is to use the esthetic guidance provided within a VQ profile to determine which information should be retained in the compressed bitstream.

In an embodiment, two or more VQ profiles may be associated with a single compressed output bit stream. In other embodiments, only a single VQ profile may be associated with a particular compressed output bit stream.

As a result of the analysis performed on the compressed output bit stream by objective VQ compare module 140, objective VQ compare module 140 generated VQ feedback data which describes any discrepancies between the compressed output bit stream and any VQ profiles associated therewith. The VQ feedback describes the location and nature of the discrepancy, including but not limited to, differences in video quality, sharpening, contrast, and amount of details.

In step 250, the VQ feedback data is sent back to the encoder/transcoder 130. Steps 230-250 may be iteratively performed until a target video quality is achieved. Video quality feedback received by objective VQ compare module 140 may be used by encoder/transcoder 130 during the encoding/transcoding process to achieve better video compression. If the measured video quality of the encoded/transcoded digital video processed by the encoder/transcoder is higher than a target video quality, then the digital video may be re-encoded at a higher compression to obtain the target level of video quality. On the other hand, if the measured video quality of the encoded/transcoded digital video processed by the encoder/transcoder is lower than the target level, then the digital video may be re-encoded using a lower compression to achieve the target video quality.

Using Offline Pre-Processing Metadata in a Transcoding On-The-Fly (TOTF) Environment The steps of FIG. 2 have been previously described under the presumption that VQ profile 112 will be created and stored in VQ profile storage 120 prior to digital video being encoded or transcoding requiring the use of profile 112. However, it may come to pass that, for one reason or another, a VQ profile applicable to the encoding or transcoding of digital video has not yet been created and stored in VQ profile 120 at the time that encoding or transcoding of the digital video is initiated.

In an embodiment termed transcoding on-the-fly or (TOTF), only some of the VQ profiles are created and stored in VQ profile storage 120 prior to their use, while other VQ profiles are not. As an example, certain VQ profiles, termed adaptive bit rate profiles or ABR profiles, may be created and stored in VQ profile storage 120 prior to their use while other ABR profiles are not. ABR profiles are VQ profiles which are designed to be used in an adaptive bit rate context.

Collecting pre-processing information on stored content prior to real-time encoding or transcoding of the content has many benefits. Such pre-processing information created by encoding or transcoding digital video offline may be saved to a VQ profile for purposes of saving relevant encoding decisions for future use, such as during encoding or transcoding of the digital video in real-time.

As one example of the benefits of using offline pre-processing metadata in a transcoding-on-the-fly (TOTF) environment, note that certain picture level best encoding parameters, such as the picture quantizer (Qp), can be determined using objective video quality measurements. Using the picture quantizer (Qp) value when encoding/transcoding the digital content in real-time results in better video quality and lower average bitrate.

As another exemplary benefit, encoding decisions previously made may be saved for subsequent advantageous use. The High Efficiency Video Coding (HEVC) codec, for example, is a very heavy processing codec due mostly because of the evaluation of multiple 1000 s of modes for each LCU (block unit of 64×64 pixels). By saving the encoding decisions and using those later, the real-time transcoding can be up to 10 times faster. In an embodiment, the information about saved encoding decisions that is saved is optimized based on tradeoffs between storage and compute resources. The size of the saved encoding decisions may correspond to up to 50% of the complete encoded/transcoded bitstream. It may be advantageous to save only the most compute expansive decisions. The "mode decisions" are the most compute intensive encoding decisions. Saving the "mode decision" will require a significantly smaller ratio of the encoded/transcoded bitstream.

As another example benefit of collecting pre-processing information on stored content prior to real-time encoding or transcoding of the content, the measured video quality of each segment of digital video and the video quality associated with each VQ profile may be saved for subsequent advantageous use. By encoding/transcoding digital content using different VQ profiles and comparing the resulting video quality, one can make a real-time decisions about the best VQ profile to use for each segment of digital video. In many events, it is possible to encode/transcode using a VQ profile associated with a lower quality that produces encoded/transcoded video of the same or similar quality. As a result, the average bit size of the encoded bit stream is reduced and the average encoding/transcoding density is increased.

Yet another benefit of collecting pre-processing information on stored content prior to real-time encoding or transcoding of the content is the use of the HVQ concept to reduce the storage size of the top profile (i.e, the profile that is associated with the highest quality video). The TOTF solution for cloud DVR stores only the top profile or profiles. Using HVQ allows the storage size of the top profile to be reduced significantly. For example, the total storage size that is required to store the content may be reduced by half versus CBR.

As TOTF can take a multi-pass approach to encoding (whether it be an algorithmic and/or VQ optimization), some amount of this iterative computation may be performed in advance with the values stored with a reference file. When TOTF is started, the TOTF may use the reference file to enable computation with less effort to completion than from a standing start, thereby yielding the benefit of a faster compute (quicker response to the consumer) using the same compute resources and/or less compute resources (able to handle more consumer demand simultaneously with the same compute resources). Embodiments of the invention may store offline pre-processing metadata used in this fashion in a data structure or reference file.

Figure 5:
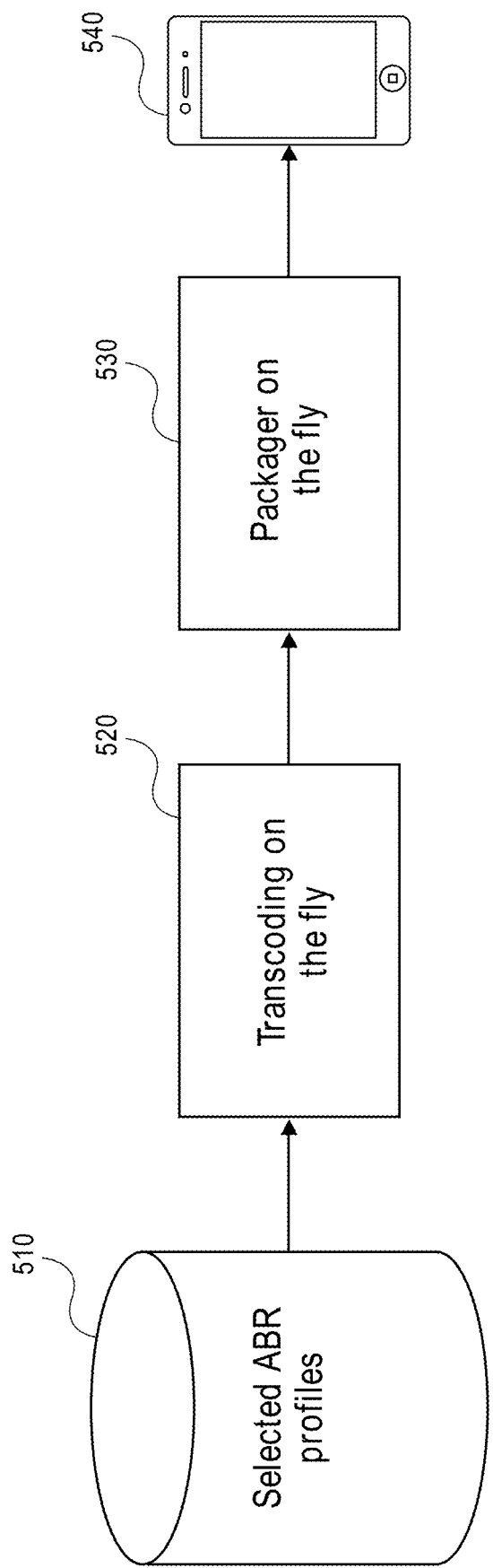
FIG. 5 is a block diagram of transcoding on the fly according to an embodiment of the invention.
Figure 6:
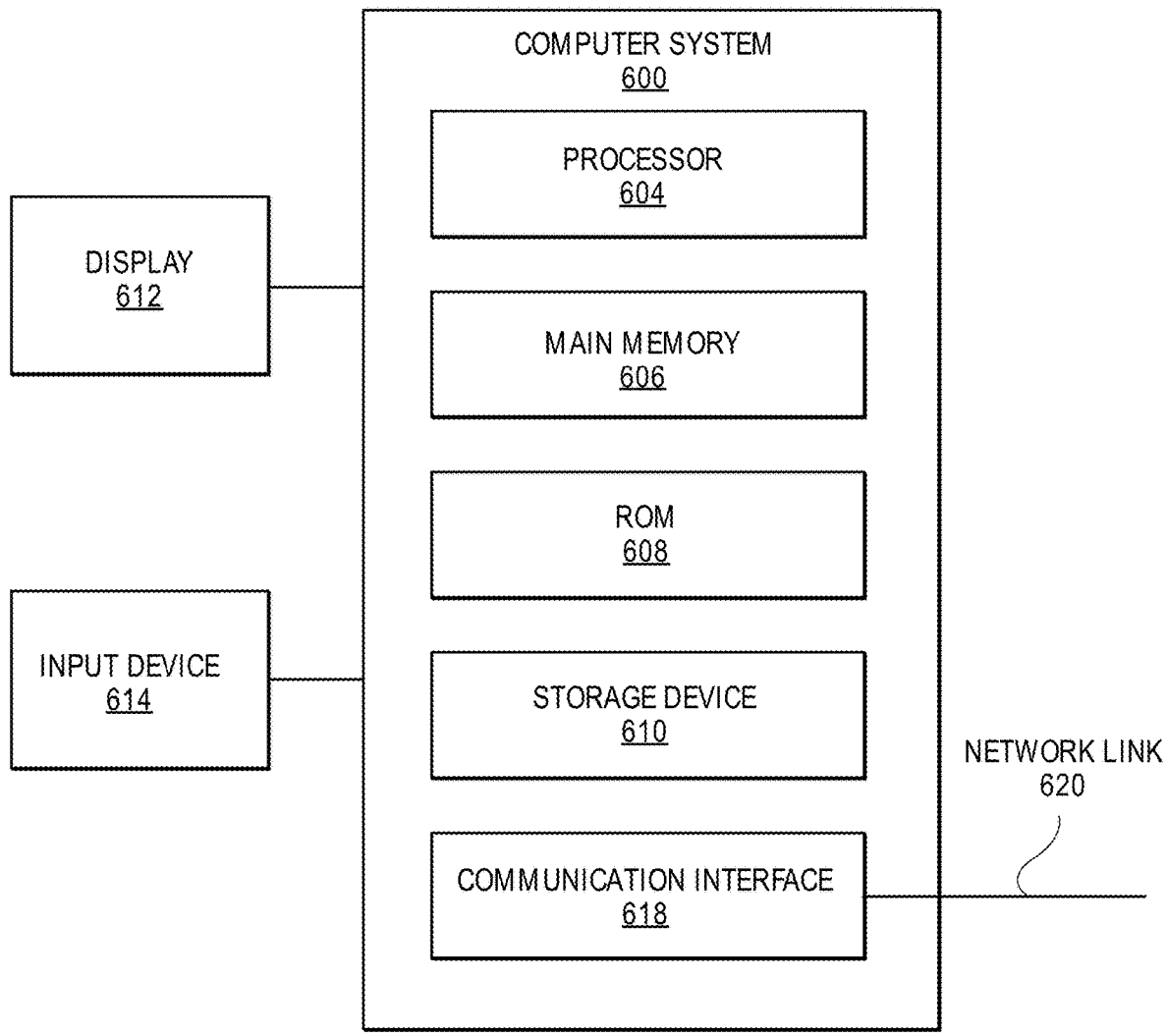
FIG. 6 is a block diagram that illustrates a computer system upon which software performing encoding digital video using subjective video quality preferences may be implemented according to an embodiment of the invention.

FIG. 5 is a block diagram of transcoding on the fly according to an embodiment of the invention. In performing transcoding on the fly, an embodiment may initially create and store one or more adaptive bit rate (ABR) profiles in profile storage 510. The one or more adaptive bit rate (ABR) profiles stored in profile storage 510 are those needed to deliver the ABR service. When an ABR profile other than those stored in profile storage 510 is required to be delivered to the user, the required ABR profile is created in real-time (step 520) by transcoding one of the ABR profiles stored in profile storage 510 to create the particular ABR profile required. The newly created ABR profile may then be packaged (step 530) in real-time and delivered to the user (step 540).

Note that for purposes of describing a concrete example, transcoding on the fly was discussed above with reference to ABR profiles; however, embodiments of the invention may perform transcoding on the fly with any type of VQ profile and may be employed in other contexts that ABR digital video delivery.

Hardware Mechanisms

Note that each of the steps depicted in FIG. 2 may be performed by software that executes upon a computer system. In an embodiment, FIG. 5 is a block diagram that illustrates a computer system 500 upon which software performing one or more of the steps or functions discussed above may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Computer system 500 may be coupled to a display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments of the invention may include any number of input devices 514 coupled to computer system 500.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory tangible medium that participates in storing instructions which may be provided to processor 504 for execution. Note that transitory signals are not included within the scope of a non-transitory machine-readable storage medium. A non-transitory machine-readable storage medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction and/or application. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for encoding or transcoding a digital video, which when executed by one or more processors, cause:
   receiving, from a user via a user interface, a set of user-supplied criteria about independent visual parameters for encoding or transcoding said digital video, wherein said independent visual parameters are employed in a calculation of video quality measured by an encoder or transcoder, and wherein said independent visual parameters include one or more of: the amount of contrast, the amount of details, luminance, the sensitivity to black and white levels, and motion;
   creating a video quality profile for said user that describes said set of user-supplied criteria about said independent visual parameters; and
   upon determining that said video quality profile is associated with a compressed digital video bit stream, iteratively re-encoding or re-transcoding said compressed digital video bit stream to a final rate of compression, frame by frame, for said compressed digital video bit stream by using said video quality profile to ensure that the final rate of compression, for each frame, in said compressed digital video bit stream satisfies said user-supplied criteria about said independent visual parameters.

2. The one or more non-transitory computer-readable storage mediums of claim 1, wherein determining a final rate of compression for said compressed digital video bit stream using said video quality profile comprises:
   upon determining that a measured video quality of said compressed digital video bit stream exceeds a target video quality, then re-encoding said compressed digital video bit stream using a higher rate of compression; and
   upon determining that a measured video quality of said compressed digital video bit stream is lower than said target video quality, then re-encoding said compressed digital video bit stream using a lower rate of compression.

3. The one or more non-transitory computer-readable storage mediums of claim 2, wherein said target video quality is based, at least in part, on said video quality profile.

4. The one or more non-transitory computer-readable storage mediums of claim 1, wherein determining said final rate of compression for said compressed digital video bit stream using said video quality profile comprises: consulting said video quality profile to determine a specific bit allocation for a particular visual parameter, configured by said user-supplied criteria described by said video quality profile, for said compressed digital video bit stream.

5. The one or more non-transitory computer-readable storage mediums of claim 1, wherein said determining a final rate of compression for said compressed digital video bit stream comprising using a plurality of video quality profiles which includes said video quality profile.

6. The one or more non-transitory computer-readable storage mediums of claim 5, wherein said plurality of video quality profiles each cause a different constant bit rate or average variable bit rate to be used in re-encoding said compressed digital video bit stream, and wherein execution of the one or more sequences of instructions further cause:
   identifying a highest resolution and frame rate that provides a target video quality for bit rates associated with each of the plurality of video quality profiles.

7. The one or more non-transitory computer-readable storage mediums of claim 1, wherein said user is associated with a supplier or provider of said digital video and is not a viewer of said digital video.

8. The one or more non-transitory computer-readable storage mediums of claim 1, wherein said user is a viewer of said digital video.

9. The one or more non-transitory computer-readable storage mediums of claim 1, wherein said user is a viewer of said digital video, and wherein said compressed digital video bit stream is initially created using a first set of esthetic digital video preferences associated with a supplier or provider of digital video.

10. One or more non-transitory computer-readable storage mediums storing one or more sequences of instructions for encoding or transcoding a digital video, which when executed by one or more processors, cause:
   creating a video quality profile that describes one or more of a set of features supported by a display device, wherein said set of features includes a physical screen size of said display device;
   identifying that a display device, of a plurality of display devices, is intended to display said compressed digital video; and
   upon determining that said video quality profile is associated with said display device, determining a final rate of compression, frame by frame, for said compressed digital video using said video quality profile and encoding or transcoding said digital video, frame by frame, in said final rate of compression.

11. The one or more non-transitory computer-readable storage mediums of claim 10, wherein determining said final rate of compression for said compressed digital video bit stream using said video quality profile comprises:
consulting said video quality profile to determine a specific bit allocation for one or more visual parameters for said compressed digital video bit stream.

12. The one or more non-transitory computer-readable storage mediums of claim 10, wherein said set of features supported by said display device further include support for a three dimensional display.

13. The one or more non-transitory computer-readable storage mediums of claim 10, wherein said user is associated with a supplier or provider of said digital video and is not a viewer of said digital video.

14. The one or more non-transitory computer-readable storage mediums of claim 10, wherein said user is a viewer of said digital video.

15. The one or more non-transitory computer-readable storage mediums of claim 10, wherein said user is a viewer of said digital video, and wherein said compressed digital video bit stream is initially created using a first set of user-supplied criteria about visual parameters that may be used to encode or transcode said digital video whereby said user-supplied criteria are supplied by a supplier or provider of digital video.

16. An apparatus for encoding or transcoding a digital video, comprising:
one or more processors; and
one or more non-transitory computer-readable storage mediums storing one or more sequences of instructions, which when executed, cause:
receiving, from a user via a user interface, a set of user-supplied criteria about visual parameters used in encoding or transcoding said digital video,
wherein said individual visual parameters are employed in a calculation of video quality measured by an encoder or transcoder, and wherein said independent visual parameters include one or more of: the amount of contrast, the amount of details, luminance, the sensitivity to black and white levels, and motion;
creating a video quality profile for said user that describes said set of user-supplied criteria about visual parameters; and
upon determining that said video quality profile is associated with a compressed digital video bit stream, iteratively re-encoding or re-transcoding said compressed digital video bit stream to a final rate of compression, frame by frame, for said compressed digital video bit stream by using said video quality profile to ensure that the final rate of compression, for each frame, in said compressed digital video bit stream satisfies said individual visual parameters.

17. The apparatus of claim 16, wherein said target video quality is based, at least in part, on said video quality profile.

18. A method for encoding or transcoding a digital video, comprising:
receiving, from a user via a user interface, a set of user-supplied criteria about visual parameters that are used in encoding or transcoding said digital video,
wherein said individual visual parameters are employed in a calculation of video quality measured by a encoder or transcoder, and wherein said independent visual parameters include one or more of: the amount of contrast, the amount of details, luminance, the sensitivity to black and white levels, and motion;
creating a video quality profile for said user that describes said set of user-supplied criteria about said visual parameters; and
upon determining that said video quality profile is associated with a compressed digital video bit stream, iteratively re-encoding or re-transcoding said compressed digital video bit stream to a final rate of compression, frame by frame, for said compressed digital video bit stream by using said video quality profile to ensure that the final rate of compression, for each frame, in said compressed digital video bit stream satisfies said individual visual parameters.

19. The method of claim 18, wherein said target video quality is based, at least in part, on said video quality profile.

20. The one or more non-transitory computer-readable storage mediums of claim 1, wherein execution of the one or more sequences of instructions further cause:
the user interface displaying in real-time the compressed digital video bit stream that satisfies said user-supplied criteria about said independent visual parameters.

* * * * *